(12) United States Patent
Terrels (10) Patent No.: US 7,243,473 B2
(45) Date of Patent: Jul. 17, 2007

(54) POST ASSEMBLY AND TRIM RING

(76) Inventor: Christopher J. Terrels, 1324 Central Ave., Ocean City, NJ (US) 08226

( * ) Notice: Subject to any disclaimer, the term of this patent is extended or adjusted under 35 U.S.C. 154(b) by 238 days.

(21) Appl. No.: 10/635,352

(22) Filed: Aug. 6, 2003

(65) Prior Publication Data
US 2004/0025460 A1 Feb. 12, 2004

Related U.S. Application Data

(60) Provisional application No. 60/401,314, filed on Aug. 6, 2002.

(51) Int. Cl.
*E04C 3/30* (2006.01)
(52) U.S. Cl. .................. 52/732.1; 52/732.2; 52/730.4; 52/736.1
(58) Field of Classification Search ............... 52/588.1, 52/736.4, 726.3, 298, 732.1, 732.2, 730.4, 52/723.1, 300, 736.1, 736.3; 403/109.1, 403/109.2, 109.3, 321, 322.1, 322.2, 325, 403/326, 327, 230, 231; 248/346.01, 346.03, 248/346.04, 519, 218.4
See application file for complete search history.

(56) References Cited

U.S. PATENT DOCUMENTS

| | | | |
|---|---|---|---|
| 2,242,427 A | 5/1941 | Heanue | |
| 2,703,724 A | 3/1955 | Der Yuen et al. | |
| 3,886,710 A * | 6/1975 | Krause et al. | ................. 403/11 |
| 3,921,960 A | 11/1975 | Bright | |
| 3,977,800 A * | 8/1976 | Cassel | ......................... 403/172 |
| 4,027,452 A | 6/1977 | Donnell | |
| 4,102,529 A | 7/1978 | Neblung et al. | |
| 4,123,863 A | 11/1978 | Becker | |
| 4,127,974 A | 12/1978 | Wendt | |
| 4,150,517 A | 4/1979 | Warner, Sr. | |
| 4,150,907 A | 4/1979 | Thurnauer | |
| 4,160,052 A | 7/1979 | Krysiak et al. | |
| 4,187,649 A | 2/1980 | Chaffee | |
| 4,296,587 A * | 10/1981 | Berdan | ..................... 52/786.1 |
| 4,333,288 A | 6/1982 | Coombs | |
| 4,344,719 A | 8/1982 | Thom | |
| 4,452,138 A * | 6/1984 | Bubley et al. | ........... 101/127.1 |

(Continued)

OTHER PUBLICATIONS

"Picket Fence Designs", Kroy Building Products, Inc., York, NE, 1997 Picket Fence Design.

*Primary Examiner*—Naoko Slack
*Assistant Examiner*—Chi Q. Nguyen
(74) *Attorney, Agent, or Firm*—RatnerPrestia (57) ABSTRACT

An assembly for posts includes a rigid interior column and a decorative shell mounted around the column. The interior column is anchored to a base that is mountable to a floor, ceiling or other support structure. The base has one or more vertical uprights configured to support the interior column and/or shell. The interior column is supported in a socket in the base. The column may be secured to the base by a latch that positively engages the column and the socket. The latch operates independently of any weight bearing down on the column. The column may be secured to both the floor and the ceiling by latches that cooperate with bases on both ends of the column. An optional trim with interlocking pieces may be installed around the shell to provide a decorative transition where the post mounts to a floor, ceiling or other structure.

19 Claims, 10 Drawing Sheets

U.S. PATENT DOCUMENTS

| | | | |
|---|---|---|---|
| 4,477,059 A | 10/1984 | Willis | |
| 4,485,604 A | 12/1984 | Palamara et al. | |
| 4,512,127 A | 4/1985 | Attaway | |
| 4,569,171 A | 2/1986 | Kuhr et al. | |
| 4,621,471 A | 11/1986 | Kuhr et al. | |
| 4,642,957 A | 2/1987 | Edwards | |
| 4,683,634 A * | 8/1987 | Cole | 29/412 |
| 4,738,069 A | 4/1988 | Williams | |
| 4,958,807 A | 9/1990 | Wylie | |
| 5,040,456 A * | 8/1991 | Hayes | 101/127.1 |
| 5,061,000 A | 10/1991 | Haugen et al. | |
| 5,179,811 A | 1/1993 | Walker et al. | |
| 5,193,786 A | 3/1993 | Guenther | |
| 5,335,471 A | 8/1994 | Kupiec | |
| 5,370,368 A | 12/1994 | Terrels | |
| 5,398,469 A | 3/1995 | Logan | |
| 5,457,923 A | 10/1995 | Logan et al. | |
| 5,516,225 A | 5/1996 | Kvols | |
| 5,560,170 A | 10/1996 | Ganser et al. | |
| 5,625,992 A | 5/1997 | Strick et al. | |
| 5,647,184 A | 7/1997 | Davis | |
| 5,690,237 A | 11/1997 | Marzec | |
| 5,803,527 A | 9/1998 | Fujiya | |
| 5,819,491 A | 10/1998 | Davis | |
| 5,827,029 A | 10/1998 | Denman | |
| 5,873,671 A | 2/1999 | West | |
| D410,753 S | 6/1999 | Davis | |
| 5,941,033 A | 8/1999 | Adams | |
| 5,956,920 A * | 9/1999 | Davis | 52/736.3 |
| D415,287 S | 10/1999 | Davis | |
| 5,966,891 A | 10/1999 | Fagan et al. | |
| 6,030,020 A | 2/2000 | Malm | |
| 6,076,329 A | 6/2000 | Thomson | |
| 6,115,982 A | 9/2000 | Lindenberg | |
| 6,141,928 A | 11/2000 | Platt | |
| 6,148,883 A | 11/2000 | Wilson | |
| 6,176,637 B1 | 1/2001 | Hatlan et al. | |
| 6,199,340 B1 | 3/2001 | Davis | |
| 6,203,233 B1 | 3/2001 | Stanley | |
| 6,212,835 B1 | 4/2001 | Schiedegger et al. | |
| 6,213,452 B1 | 4/2001 | Pettit et al. | |
| 6,216,407 B1 | 4/2001 | LeBlanc | |
| 6,216,413 B1 | 4/2001 | Lapointe | |
| 6,223,486 B1 | 5/2001 | Dunham | |
| 6,226,950 B1 | 5/2001 | Davis | |
| 6,286,161 B1 | 9/2001 | McCall | |
| 6,295,783 B1 | 10/2001 | Davis | |
| 6,305,670 B1 | 10/2001 | Ward et al. | |
| 6,332,657 B1 * | 12/2001 | Fischer | 312/111 |
| 6,412,250 B2 | 7/2002 | Davis | |
| 6,413,004 B1 | 7/2002 | Lin | |
| 6,467,756 B1 | 10/2002 | Elsasser | |
| 6,471,192 B1 | 10/2002 | Erwin | |
| 6,516,581 B2 * | 2/2003 | Paul et al. | 52/506.07 |
| 6,557,831 B2 | 5/2003 | Erwin | |
| 6,565,069 B2 | 5/2003 | Morris | |
| 6,643,982 B1 | 11/2003 | Lapp, Jr. et al. | |
| 2002/0106469 A1 | 8/2002 | Fanucci | |
| 2004/0025460 A1 | 2/2004 | Terrels | |
| 2004/0206028 A1 | 10/2004 | Terrels et al. | |

* cited by examiner

POST ASSEMBLY AND TRIM RING

RELATED APPLICATIONS

This application claims the benefit of the filing date of U.S. Provisional Application No. 60/401,314, filed Aug. 6, 2002, the entire disclosure of which is incorporated herein by reference.

SUMMARY OF THE INVENTION

The present invention includes an assembly for posts, such as railing posts, newel posts, columns and other structural elements. The assembly may be used in a variety of structures, including vinyl porch columns, deck railings, and banisters. The assembly has a rigid interior column and a decorative sleeve mounted around the column. The interior column is anchored to a base that may be mounted to a floor, ceiling or other support structure. The base may have one or more vertical uprights configured to support the interior column and/or sleeve.

The assembly may be installed with minimal use of tools by amateur builders or skilled contractors. In one embodiment, the interior column is supported on the base plate between a pair of arcuate flanges that extend upwardly on the base plate. The column may be stood on one end and supported in a vertical position between the flanges.

In the prior art, columns are typically held in place under the weight of a roof that bears down on the column and base. If the weight of the roof is removed, such as during a tornado event or other event where an upward load lifts the roof off of the column, there is nothing to stabilize the column on the floor or base. In the present invention, the column may be secured to the base by a latch that positively engages the column and flanges. The latch operates independently of any weight bearing down on the column. The column may be secured to both the floor and the ceiling by latches on both ends of the column.

An optional trim may be installed around the column to conceal sections of the base that extend beyond the column. In addition, an optional trim may be installed to provide a decorative transition where the post mounts to a floor, ceiling or other structure. In one embodiment of the invention, the trim is formed by a number of interlocking sections with ratchet connections that lock the trim sections together. The trim sections may have one or more scored sections that can be broken away to adjust the length of the trim sections. One or more trim sections may be adjusted to be compatible with posts of different sizes and shapes.

DESCRIPTION OF THE DRAWINGS

The foregoing summary as well as the following description will be better understood when read in conjunction with the figures in which.

DETAILED DESCRIPTION OF THE PREFERRED EMBODIMENT

Figure 1:
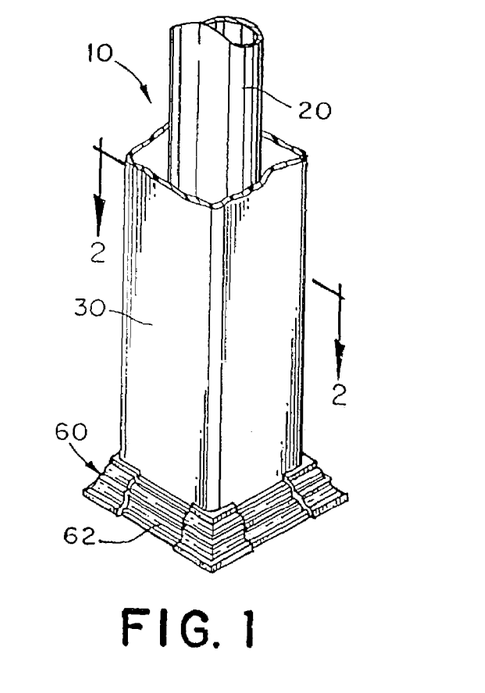
FIG. 1 is a fragmented perspective view of a post assembly and trim frame, in accordance with the present invention, showing a first embodiment of a post structure.

Referring to FIGS. 1–15 in general, and to FIG. 1 specifically, an assembly for a post is shown and designated generally as 10. The assembly 10 and its components may be used in a variety of structures, including porch columns, deck railings and banisters. The components of the post assembly 10 may be manufactured and sold individually or together in kits. The post assembly 10 in FIG. 1 shows a covered post used in outdoor applications. The assembly 10 is supported by a rigid column 20 that forms the skeleton of the structure. A generally rectangular shell or sleeve 30 surrounds the support column 20. A decorative trim frame 60 is installed around the base of the shell 30, as described in more detail below.

The rigid column 20 is shielded from view by the shell 30, which may or may not be shaped and painted to convey a particular post style. The column 20 may be a load bearing post, as in the case of a porch column, or a non-load bearing post, as in the case of a newel post for a railing. In FIG. 1, a hollow cylindrical post column 20 is shown. The column 20 may be formed of any material and preferably is formed of a rigid metal material such as aluminum or galvanized steel.

Figure 2:
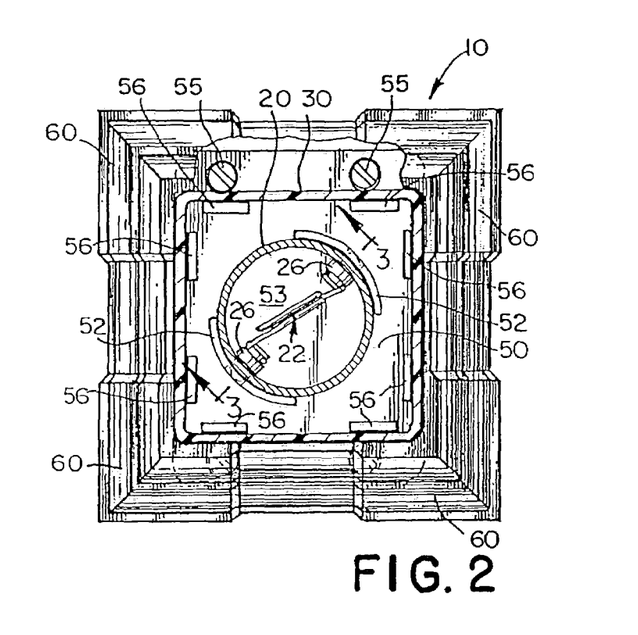
FIG. 2 is a partial sectional plan view of the post assembly of FIG. 1 as seen from the line 2—2 of FIG. 1.
Figure 3:
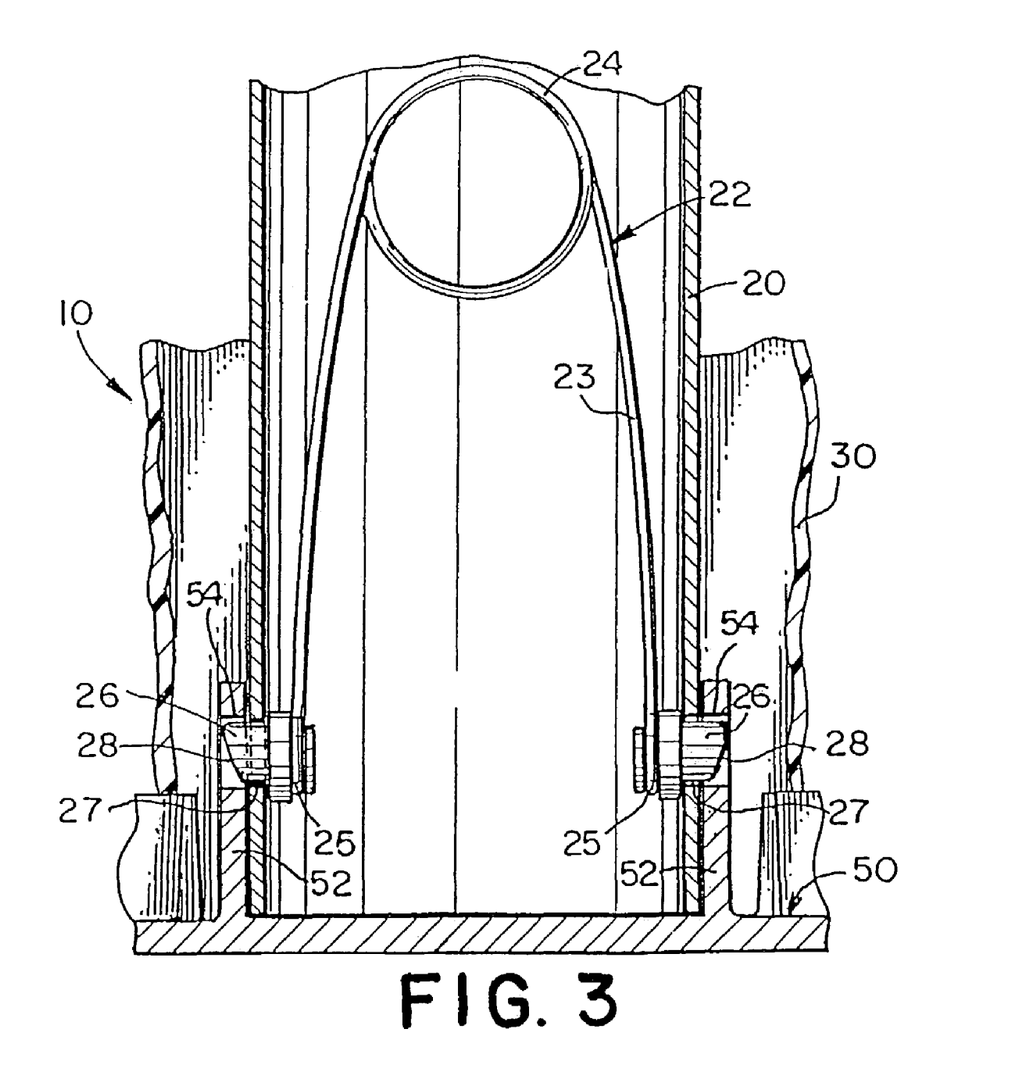
FIG. 3 is a fragmented sectional elevation view of the post assembly of FIG. 2 taken along the line 3—3 of FIG. 2.
Figure 4:
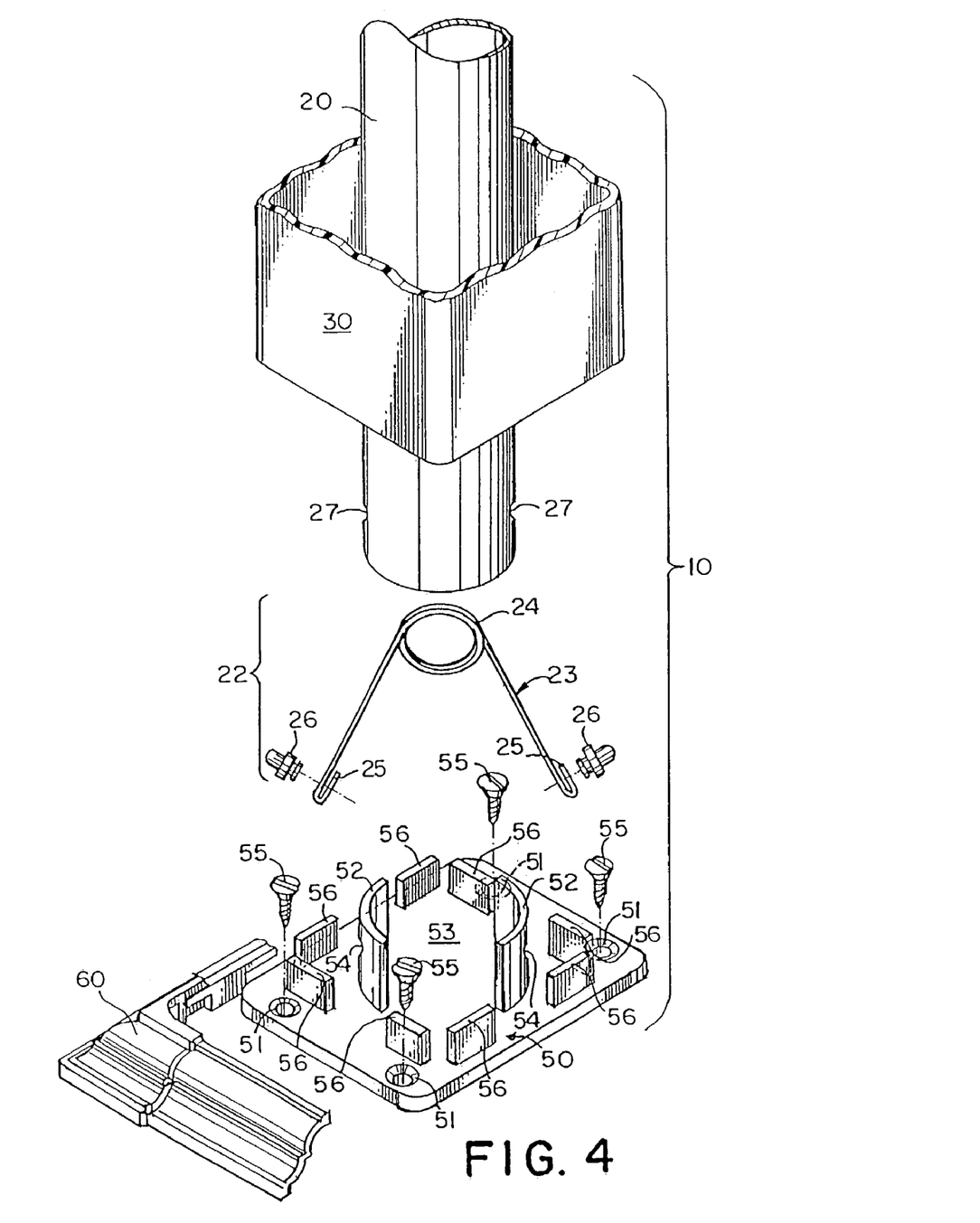
FIG. 4 is an exploded fragmented perspective view of the post assembly of FIG. 1.

Referring now to FIGS. 2–4, the interior of the post assembly 10 is shown. The support column 20 and outer shell 30 are supported on a generally rectangular base 50. The base 50 is configured to be mounted on a floor, deck or other surface, and may be installed at grade, above grade or below grade as desired. In some column installations, two bases 50 may be used: one to anchor the bottom of the post to a floor surface and the other to anchor the top of the post to a ceiling or other overhead structure. For purposes of this description, the assembly 10 will be described and illustrated with one base 50 mounting the post to the floor. Bases 50 that are mounted to overhead structures are connected in the same manner as bases mounted to floors, with the exception that a base at the top of the column will be inverted relative to a base mounted at the bottom of the column. A variety of mounting methods may be used to mount the base 50. In FIG. 4, the base 50 is shown with four screw holes 51 adapted to receive screws 55. The screws 55 may be inserted through the holes 51 and screwed into a floor or other surface to mount the base 50. The screw holes 51 may be countersunk, as shown in FIG. 4, so that the top of the screws 55 are flush with the top of the base 50.

The base 50 may have a plurality of uprights configured to support the column 20 and/or shell 30. Referring to FIGS. 2 and 4, the column 20 is shown supported between a pair of arcuate flanges 52 that form a circular socket 53. The flanges 52 may be molded or cast with the base 50 or connected to the base by welding, soldering or other type of connection. The curvature of the flanges 52 is generally circular and configured to conform to the exterior of the column 20. The flanges 52 are positioned relative to each other such that the socket 53 is generally circular. The distance between the interior faces of the flanges 52, taken through the center of the circular socket, is equal to or slightly larger than the outer diameter of the support column 20. In this arrangement, the socket 52 is configured to receive the column in a snug fit.

In the preferred embodiment, the column 20 is locked in the socket 53 by a latch mechanism 22. The latch 22 is configured to automatically lock the column 20 in a fixed position when an end of the column is inserted into the socket 53. Referring to FIG. 3, the latch 22 comprises a torsion spring 23 disposed in the interior of the column 20. The torsion spring 23 has a wound coil end 24 and a pair of opposing terminal ends 25 that extend toward the end of the column. The spring 23 is installed in the column 20 in a compressed state so that the terminal ends 25 are biased outwardly. The bias of the spring 23 urges the terminal ends 25 outwardly into engagement with the interior surface of the column 20.

The terminal ends 25 of the spring 23 are each connected with a pin 26, as shown in FIG. 3. The pins 26 project radially outwardly relative to the column 20 into engagement with the wall of the column. The pins 26 are configured to cooperate with the walls of the socket 53 to lock the column 20 in the socket in a snap-in connection. The side wall of the column 20 has a pair of apertures 27 that are adapted to receive the pins 26 when the pins are aligned with the apertures. The outward bias of the compressed spring 23 urges the terminal ends 25 radially outwardly such that the pins 26 project into the apertures 27. The pins may have any cross-sectional shape that allows the pins to penetrate into the apertures 27. In FIGS. 2–3, the pins 26 are shown having a generally cylindrical cross-section.

The pins 26 are configured to engage a pair of openings 54 formed through each of the flanges 52 to secure the column 20 in the socket 53. The openings 54 are disposed 180° apart in the socket 53 and may be aligned coaxially with the apertures 27 in the column 20 when the column is inserted in the socket. The pins 26 are configured to extend through the wall of the column 20 and project into the openings 54 in the flanges 52. As shown in FIG. 3, the pins 26 have tapered edges 28 that contact the flanges 52 as the column 20 is inserted into the socket 53. Prior to insertion of the column into the socket 53, the tapered ends 28 of the pins 26 project outside the apertures 27 in the column 20. During insertion of the column 20 into the socket 53, contact between the flanges 52 and the tapered ends 28 of the pins 26 causes the pins to be displaced radially inwardly such that the pins enter the socket and slide along the interior of the flanges 52. The pins 26 remain inwardly deflected against the bias of the spring 23 until the apertures 27 in the column 20 align coaxially with the openings 54 in the flanges 52. Once the apertures 27 are aligned with the openings 54, the interior surface of the flanges 52 no longer retains the pins 26 inwardly against the bias of the spring 23. Therefore, the pins 26 may snap outwardly into the openings under the bias of the spring 23.

Preferably, the apertures 27 and openings 54 are positioned so as to align coaxially when the column is fully inserted into the socket 53 and contacts the end of the socket. In this arrangement, the pins 26 may be snap-fit into the openings 54 in response to rotation of the column, and the depth of insertion need not be adjusted simultaneously to achieve alignment between the pins and the openings. The pins 26 are configured to engage the sides of the openings 54 to limit axial and rotational displacement of the column relative to the socket 52 and base 50. The diameter of the pins 26 are preferably slightly smaller than the diameter of the openings 54 in the flanges 52. In this arrangement, the pins 26 readily snap outwardly once they are axially aligned with the openings 54. The clearance between the pins 26 and interior edges of the openings 54 is preferably small to minimize rattling or incidental shifting of the column in the socket.

Thus far, the column 20 has been described as being inserted in a socket 53 between a pair of curved flanges 52, as shown in FIGS. 2–3. It is understood, however, that the column 20 and base 50 may be connected in several arrangements within the scope and spirit of the invention. For example, the base 50 may have a single cylindrical flange or ring collar that forms a circular socket to support the column 20, as opposed to a number of curved flanges that form the socket. In addition, the column 20 may be configured to surround the outline of one or more flanges, rather than fitting within the outline of the flanges. In such a case, a latch similar to latch 22 in FIG. 3 may be disposed in the flange or flanges in the base, with pins that extend outwardly through the flange walls. Since the column would be slid down over the flanges and pins, the pins would have edges tapered in the opposite direction to that shown in FIG. 3 so that the pins deflect inwardly as the column is slid down over the pins. As in FIG. 3, the column and flanges would have apertures that align to permit the pins to snap outwardly and secure the column to the flanges.

Referring to FIGS. 2 and 4, the shell 30 is supported on the base 50 by a plurality of vertical tabs 56. Like the arcuate flanges 52, the tabs 56 may be molded or cast with the base 50 or connected to the base by welding, soldering or other type of connection: In FIG. 2, the tabs 56 are arranged in a generally rectangular arrangement. The outside faces of the tabs 56 are configured to conform to the interior dimensions of the shell 30. More specifically, the shell 30 is configured to fit over the tabs 56 such that the outside faces of the tabs engage the interior surfaces of the shell and support the shell. Preferably, the dimensions of the rectangle formed by the outside faces of the tabs 56 are equal to the interior dimensions of the column 20 so that the column fits over the tabs in a tight frictional engagement.

A portion of the base 50 may be visible outside the shell 30 after the shell is mounted over the tabs 56. A decorative trim may be provided to cover exposed portions of the base 50 and create an attractive transition where the post meets the floor or ceiling. FIG. 1 shows a generally rectangular trim frame 60 installed around the shell 30. The trim frame 60 is formed by a plurality of interlocking pieces 62. The trim pieces 62 are assembled in an overlapping arrangement that conceals the points of connection between trim pieces and provides a continuous trim appearance around the shell 30.

The trim frame 60 may be made up of any number of frame pieces 62, depending on the geometry of the post.

Figures 5, 6, 7:
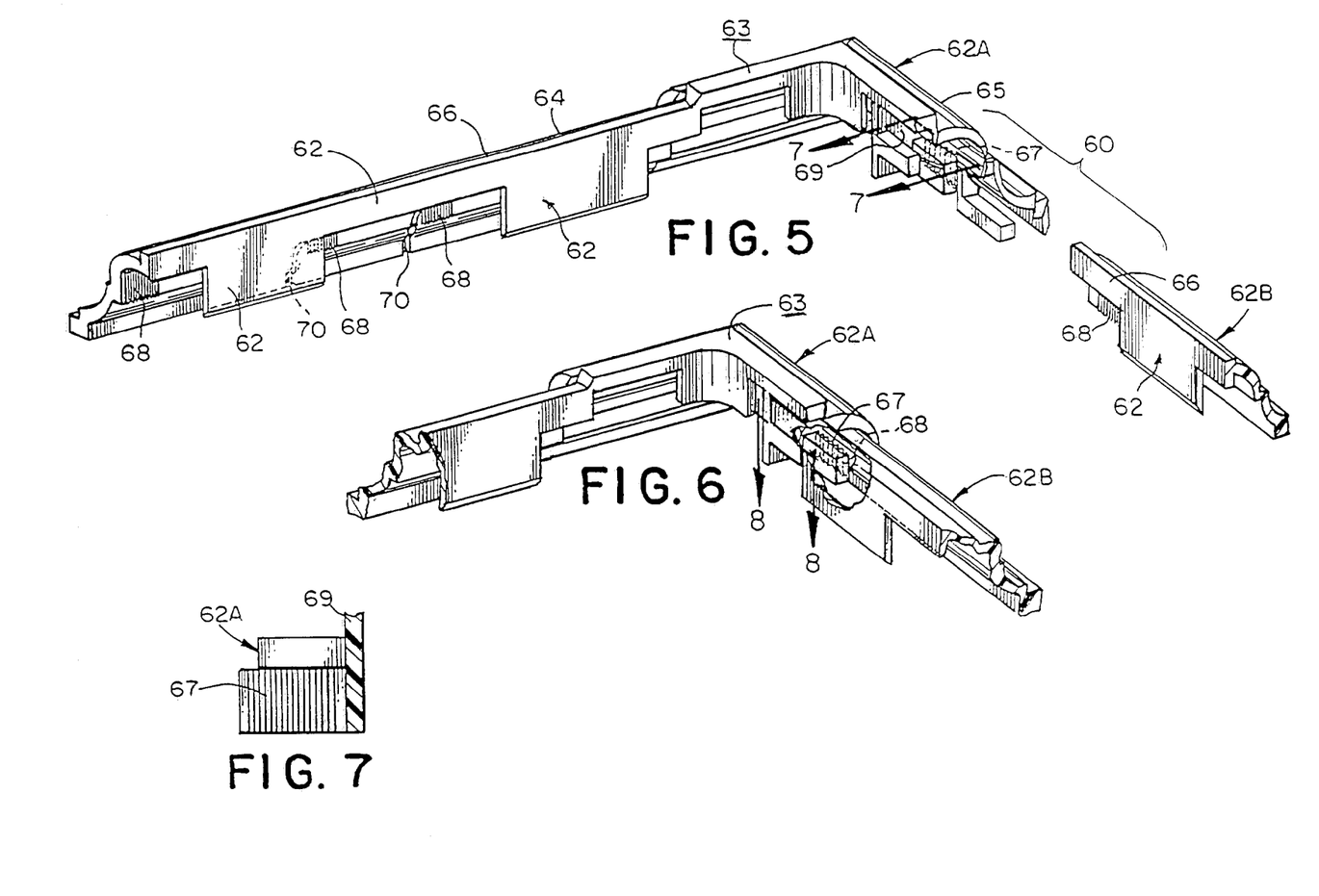
FIG. 5 is a fragmented perspective view of components of the trim frame of FIG. 1, shown in a disassembled condition.
FIG. 6 is a fragmented perspective view of the components of the trim frame in FIG. 5, shown in an assembled condition.
FIG. 7 is a fragmented sectional view of a ratchet connection in FIG. 5 taken along the line 7—7.

Referring to FIGS. 5–6, the trim frame 60 is made up of four pieces 62 that interconnect with one another in a telescoping relationship. The trim pieces 62 are preferably molded with identical shapes, to make production more economical. FIG. 5 shows one trim configuration that may be used in the present invention. A first trim piece 62A is shown in its entirety, and a second trim piece 62B is shown in partial section. Each trim piece 62 has an enlarged corner region 63 and a recessed region 64 adjacent to the enlarged corner region, as shown by piece 62A. The pieces 62 are generally "L" shaped, having a short side 65 and a long side 66 that extends generally perpendicular from the short side. The short side 65 of each piece 62 forms part of the enlarged corner region 63. The long side 66 has a terminal end that forms part of the recessed region 64. As such, the short side 65 of each trim piece 62 is adapted to receive the long side 66 of another trim piece 62 in a telescoping relationship. Referring to FIG. 5, the short side 65 of piece 62A is adapted to receive the long side 66 of piece 62B. The short side 65 of piece 62A contains an interior channel adapted to slidably receive the long side of piece 62B, as shown in FIG. 6.

Figure 8:
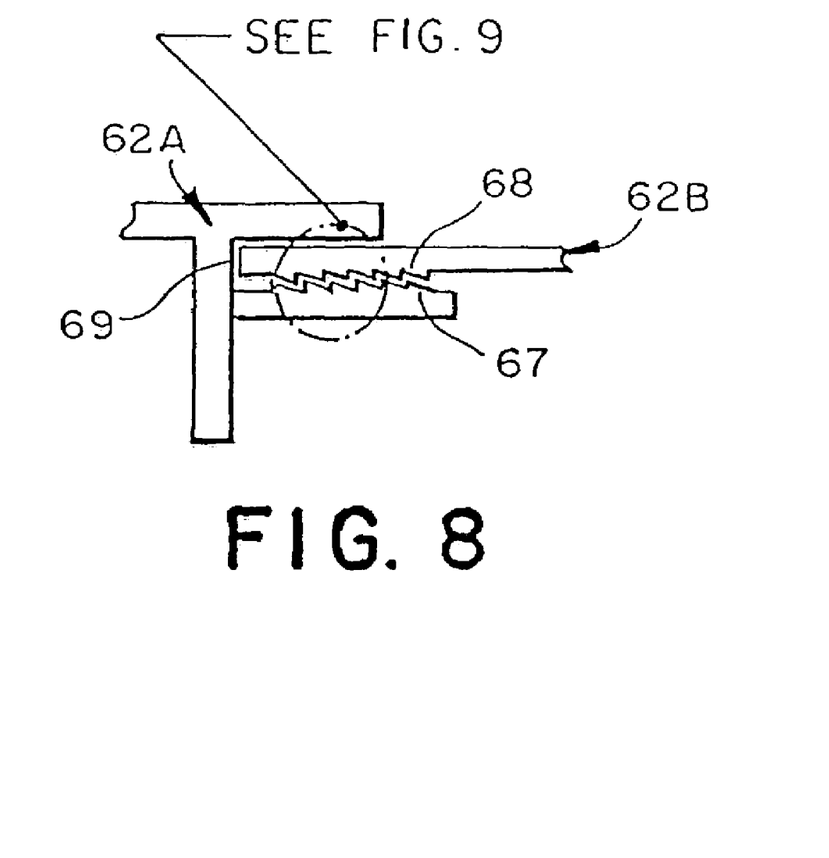
FIG. 8 is a fragmented plan view of a ratchet connection in FIG. 6 taken along the line 8—8.
Figure 9:
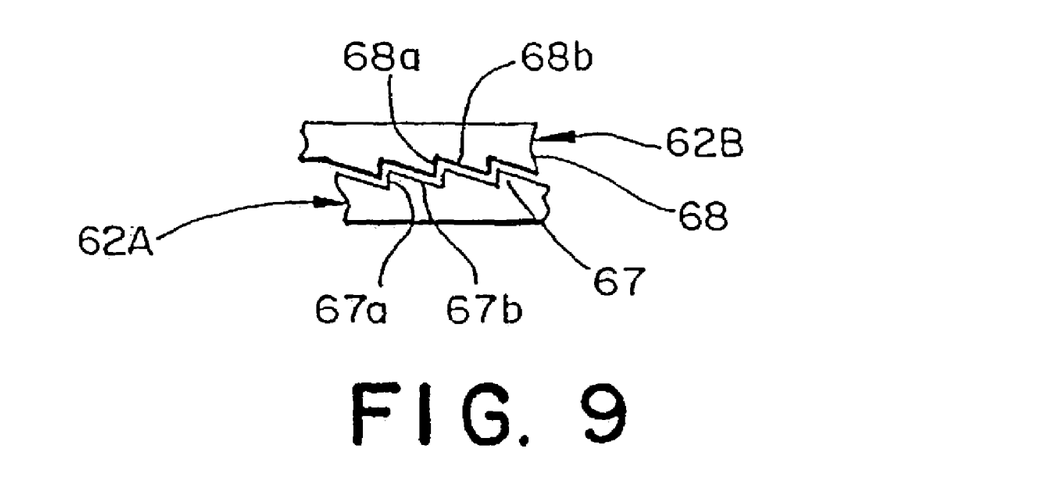
FIG. 9 is an enlarged fragmented view of ratchet teeth shown in FIG. 8.

A plurality of small ratchet teeth 67 are formed in the interior channel of the short side 65 of each trim piece 62, as shown in FIGS. 5–7. A corresponding set of ratchet teeth 68 are formed in the interior of the long side 66 of each trim piece. The ratchet teeth 67,68 may be molded with the frame pieces or be manufactured separately and attached to the frame by bonding or any other attachment method. The ratchet teeth 67,68 are configured to mate with one another when the long side 66 of a trim piece 62 is inserted into the short side 65 of an adjacent trim piece. Referring now to FIGS. 8–9, the ratchet teeth 67 have normal faces 67a which are oriented generally perpendicular to trim piece 62A and inclined faces 67b disposed at a small acute angle relative to trim piece 62A. Similarly, ratchet teeth 68 have normal faces 68a which are oriented generally perpendicular to trim piece 62B and inclined faces 68b disposed at a small acute angle to trim piece 62B. The inclined faces 67b,68b on ratchet teeth 67,68 are generally parallel to one another.

The material of the pieces 62A and 62B is sufficiently compressible and resilient to permit the ratchet teeth 68 to slide over ratchet teeth 67 as piece 62B is inserted into piece 62A. Individual ratchet teeth come to rest in the spaces between opposing ratchet teeth, as shown in FIGS. 8–9. Sliding of the ratchet teeth in the reverse direction is substantially prevented because the normal faces 67a, 68a abut and obstruct one another, preventing relative displacement of the ratchet teeth in the reverse direction. As a result, the ratchet teeth 67,68 are configured to permit sliding engagement of the trim pieces 62A,62B only in the direction of insertion. Once the ratchet teeth 67,68 are engaged with one other, the trim pieces are locked together by the engagement of the normal faces 67a,68a on the ratchet teeth. A wall 69 formed at an end of the channel in piece 62A prevents the ratchet teeth 67,68 from sliding completely past one another and disengaging during the insertion process. The wall 69 is configured to abut the terminal end of piece 62B and limit how far piece 62B is inserted within the channel. The wall 69 is positioned so that the wall abuts the terminal end of piece 62B and prevents further insertion of piece 62B at the moment that ratchet teeth 67,68 are completely engaged, as shown in FIG. 8. All four pieces 62 are assembled in the same general manner. The ratchet teeth 67,68 provide a substantially permanent connection, with no need for glue, fasteners or tools. Glue, fasteners or other connection means may be used in conjunction with the ratchet teeth 67, 68 if that is desired.

The trim pieces 62 may include break away sections on each long side 66 that permit the trim frame 60 to be sized according to the dimensions of the shell 30. Referring to FIG. 5, the long side 66 of trim piece 62A is shown having a plurality of slitted or scored locations 70 in the wall of the trim piece. The scored locations form breakable joints between adjoining sections of the long side. The trim piece 62A may be severed or broken by hand at any of the scored locations 70 to decrease the size of the trim piece. A plurality of scored locations 70 may be provided at incremental spacings on each trim piece 62. In this arrangement, the trim pieces 62 may be mass produced in one size while allowing the pieces to be compatible with a variety of post sizes and shapes. Ratchet teeth 68 may be provided adjacent each scored location 70 so that the remaining section of the trim piece 62 not broken away may be connected to an adjacent trim piece, as described above. Preferably, the trim pieces 62 are molded so that each scored section 70 is labeled with a number or indicia representing the finished dimension or length of the trim piece after it is broken at that location. In this arrangement, an installer desiring to modify the length of the trim piece 62 can easily determine the correct location at which to break the piece. The number or indicia representing the finished dimension may be formed into the mold so as to produce an indicia on the inside of the trim piece 62, where it will not be visible on the completed trim 60.

In FIGS. 5–6, the ratchet teeth 68 are shown extending from each trim piece in short spans. It may be desirable, however, to form the ratchet teeth 68 along longer spans. This permits a greater range of adjustment between trim pieces. Ratchet teeth 68 may also be formed along the entire length of the trim pieces 62. In this arrangement, the degree of overlap between trim pieces can be controlled to achieve a wide range of finished dimensions.

Figure 10:
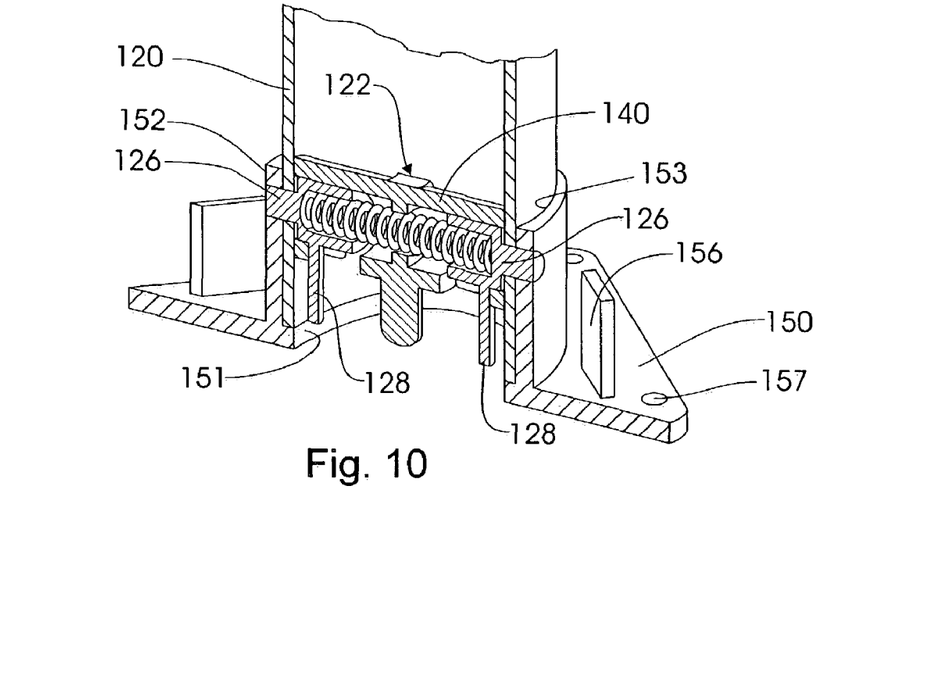
FIG. 10 is a fragmented perspective view of a second embodiment of a post structure in accordance with the present invention, taken along the line 10—10 in FIG. 12.
Figure 11:
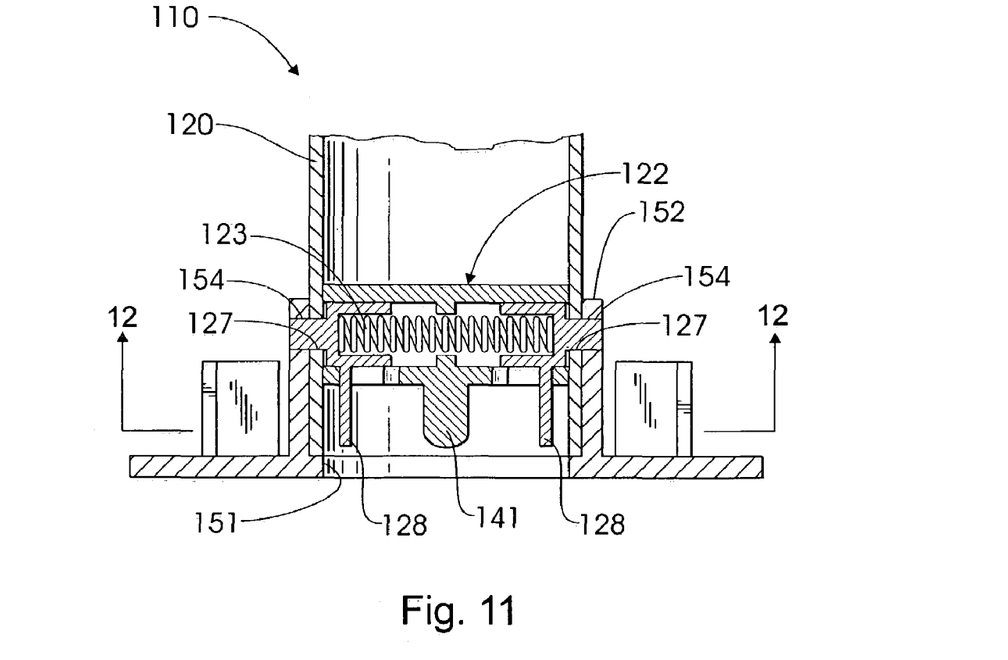
FIG. 11 is a fragmented sectional elevational view of the post structure of FIG. 10.
Figure 12:
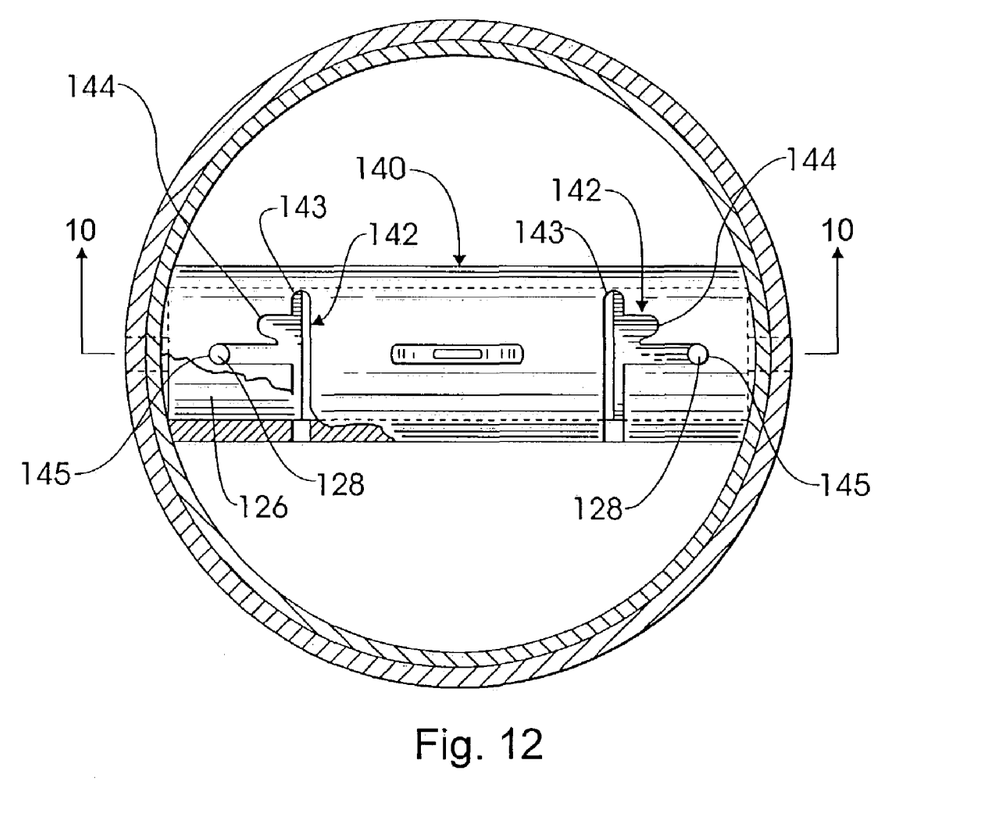
FIG. 12 is a sectional plan view of the post structure of FIG. 11, taken along the line 12—12 in FIG. 11.

Referring now to FIGS. 10–12, a second embodiment of a post structure 110 is shown in accordance with the present invention. A rigid column 120 forms the skeleton of the structure, similar to the post structure described above. The column 120 is supported by a generally rectangular base 150. The base 150 has a plurality of vertical uprights or tabs 156 that are configured to support a hollow shell around the column 120. The hollow shell is not shown in FIGS. 10–12 in order to illustrate the post assembly 110. Preferably, the base 150 has a plurality of screw holes 157 arranged toward the outer perimeter of the base so that the holes are positioned on the outside of the shell when the shell is placed over the vertical tabs 156. A circular ring collar 152 extends from the base 150 and forms a circular socket 153. The socket 153 conforms to the exterior of the column 120 and has a diameter equal to or slightly larger than the outer diameter of the column. In this arrangement, the socket 153 is configured to receive the column in a snug fit.

The column 120 is locked in the socket 153 by a generally linear latch mechanism 122 disposed in the column. The latch mechanism includes a compression spring 123 having a wound coil. The spring 123 is installed in column 120 in a compressed state so that the ends of the spring are biased outwardly against the inner wall of the column.

The ends of the spring 123 are each connected with a cylindrical piston 126. Each piston 126 has an inner bore with a diameter equal to or slightly larger than the diameter of the ends of the spring 123. The ends of the spring 123 are configured for insertion into the bores in the pistons 126 so that the pistons surround the ends of the spring. The column 120 has a pair of apertures 127 adapted to receive the pistons 126 when the pistons are aligned with the apertures. A pair of openings 154 formed through the circular collar 152 aligns with the apertures 127 in the column 120 when the column is inserted in the socket 153. The pistons 126 are configured to extend through the column apertures 127 and project into the collar openings 154 when the column 122 is inserted in the socket 153 with the apertures aligned with the openings. The outward bias of the spring urges the pistons into the apertures and openings to secure the column in the socket 153.

Figure 13:
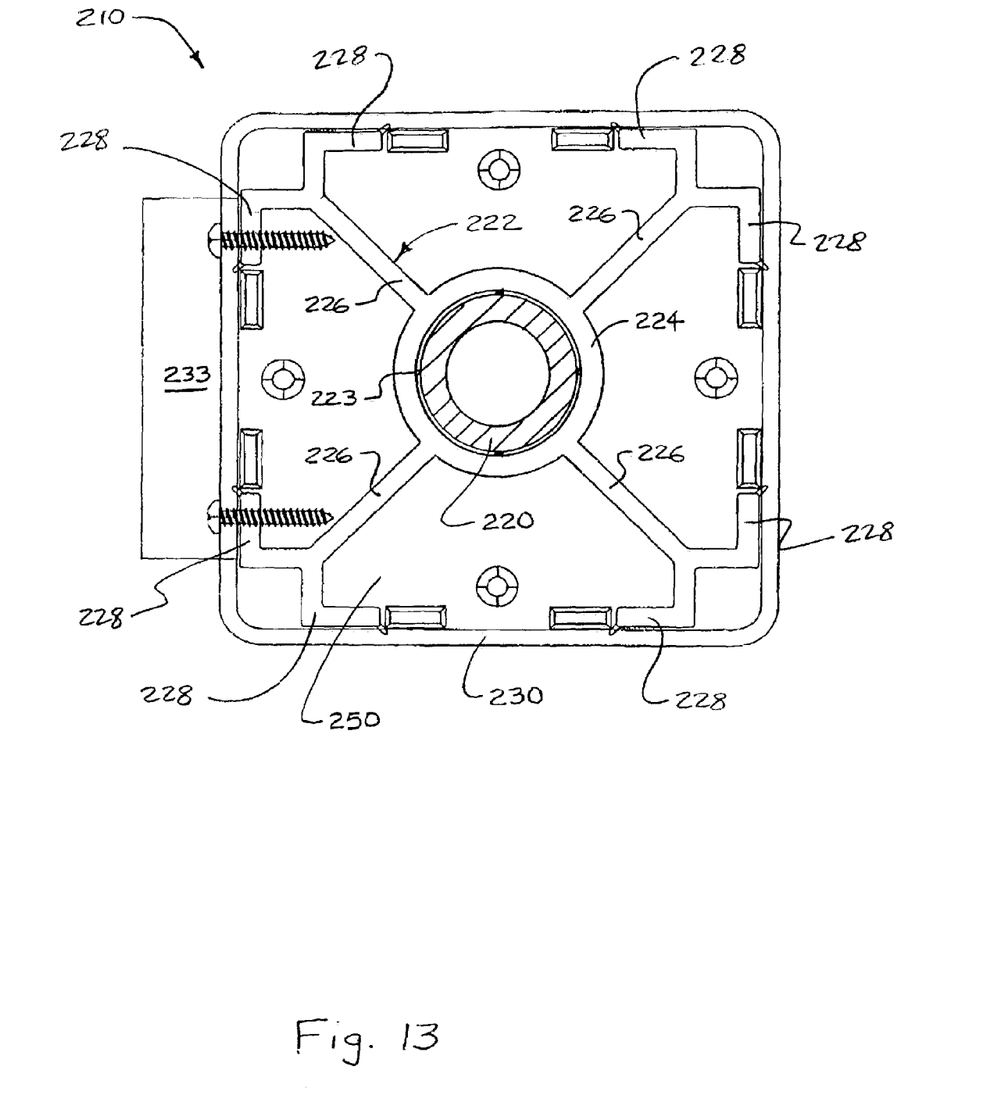
FIG. 13 is a plan view of a third embodiment of a post structure in accordance with the present invention.

The pistons 126 and compression spring 123 are enclosed in a cylindrical housing 140 which is slidably disposed in the interior of the column 120. Referring to FIG. 13, the housing 140 has a pair of guide slots 142 arranged in a mirrored configuration, with each slot located in proximity to one end of the housing. Each piston 126 has an elongated guide peg 128 that extends radially outwardly from the axis of the piston. Each guide peg 128 projects into one of the guide slots 142 in the housing 140 and slidably engages the walls of the guide slot. Each guide slot 142 includes an inner recess 143, an intermediate recess 144 and an outer recess 145 adapted to receive a guide peg. The guide pegs 128 are movable into the recesses to adjust the position of the pistons 126 relative to the column 120 and collar 152. When the guide pegs 128 are moved into the inner or intermediate recesses, the pistons 126 are moved inwardly toward the center of the housing and compress the ends of the spring. As a result, the compressed spring biases the pistons outwardly when the guide pegs are positioned in the inner recesses or intermediate recesses. The walls of the slots engage the guide pegs to retain the pistons in the inner recesses and intermediate recesses against the bias of the spring.

When the guide pegs 128 are moved inwardly into the inner recesses 143, the pistons 126 are moved to a first position in which the pistons are releasably retained in the interior of the housing. In this arrangement, the pistons 126 are disengaged from the column apertures 127, and the latch mechanism is free to slide in the interior of the column 120. The guide pegs 128 are displaceable out of engagement with the inner recesses 143 by pivoting the guide pegs radially in the guide slots 143. When the guide pegs 128 are pivoted out of the inner recesses, the guide pegs are temporarily unrestrained by the slot walls, allowing the compressed spring to expand outwardly and displace the guide pegs outwardly into the intermediate recesses. When the guide pegs 128 are positioned in the intermediate recesses, the pistons 126 are releasably retained in a second position in which the pistons extend into the column apertures but remain disengaged from the socket openings. The pistons releasably retain the latch mechanism in a fixed position in the interior of the column. The column 120, however, is free to slide within the socket 153. The guide pegs 128 are displaceable out of the intermediate recesses 144 by pivoting the guide pegs radially in the guide slots 143. When the guide pegs 128 are pivoted out of the intermediate recesses, the guide pegs are temporarily unrestrained by the slot walls, allowing the spring to expand further outwardly and displace the guide pegs into the outer recesses. When the guide pegs are positioned in the outer recesses, the pistons are retained in a third position in which the pistons project through the column apertures 127 and into the collar openings 154. In the third position, the pistons lock the latch mechanism and column in the socket.

The rectangular portion of the base 150 includes an access hole 151. When the column 120 and latch mechanism 122 are inserted in the socket on the base, the latch mechanism is positioned in proximity to the hole so that the guide pegs 128 are accessible through the hole. The hole may have any shape and configuration that permits access to the guide pegs 128. In FIGS. 10–11, the hole 151 is circular and has a diameter adapted to permit passage of a person's finger or a small tool into the column 120 in proximity to the guide pegs 128 when the column is inserted into the socket 153 on the base 150. In this arrangement, the guide pegs 128 may be accessed through the hole 151 and moved within the guide slots to connect the latch mechanism 122 with the column, and connect the column with the base 150. The guide pegs 128 may also be accessed through the access hole 151 to disconnect the latch from the column and disconnect the column from the base.

As described earlier, the latch mechanism is free to slide in the interior of the column when the pistons 126 are retained in the first position. When the guide pegs 128 are moved out of the inner recesses 143 in the guide slots 142, the housing 140 may shift in response to the movement of the guide pegs, moving the pistons 126 out of alignment with the column apertures 127. Therefore, the latch mechanism 122 preferably includes a small handle 141 extending from the center of the housing 140. The handle 141 is fixed relative to the housing 140 and may be grasped and held in place to keep the housing in a fixed position while the guide pegs 128 are displaced from the inner recesses. By holding the handle 141 in place, the housing 140 and pistons 126 may be retained in alignment with the column apertures as the guide pegs are moved in the slots. Although the latch mechanism is locked in the interior of the column when the pistons engage the column apertures, the latch mechanism is still rotatable on its axis. Therefore, the handle 141 may be grasped and held in place to stabilize the orientation of the latch mechanism as the guide pegs are pivoted out of the intermediate recesses and released into the outer recesses.

The post structure 110 may be constructed as follows. The latch mechanism 122 is inserted into one end of the column 120 by moving the pistons inwardly to the first position. More specifically, the guide pegs 128 are moved into the inner recesses 143 in the guide slots 142 so that the pistons 126 are retained inside the ends of the housing 140. The latch mechanism 122 is then inserted into one end of the column 120 and positioned so that the ends of the housing 140 are aligned with the column apertures 127. The latch mechanism 122 may be maneuvered in the column by holding the handle 141 with fingers, pliers or other implement. Once the ends of the housing 140 are aligned with the column apertures 127, the handle 141 is held in place, and the guide pegs 128 are pivoted out of the inner recesses 143. When the guide pegs 128 are pivoted out of the inner recesses 143, the pistons are no longer retained in the first position against the bias of the spring, allowing the spring to expand outwardly to move the pistons into the second position. In this position, the guide pegs 128 engage the intermediate recesses 144 in the guide slots 142, and the pistons 126 extend into the column apertures 127. The walls of the column apertures 127 limit further displacement of the latch 122, securing the latch in a fixed position relative to the column 120.

The column end containing the latch 122 is inserted into the socket 153 on base 150 and rotated until the column apertures 127 are aligned with the collar openings 154. The latch assembly 122 is then accessed through the access hole 151 in the rectangular portion of the base 150. Using fingers, pliers or other implements, the guide pegs 128 are pivoted out of the intermediate recesses 144 in the guide slots 142. When the guide pegs 128 are pivoted out of the intermediate recesses 144, the pistons 126 are no longer retained in the second position against the bias of the spring, allowing the spring to expand outwardly to move the pistons into the third position. In the third position, the guide pegs 128 engage the outer recesses in the guide slots, and the pistons project through the column apertures 127 and into the collar openings 154. The walls of the collar openings 154 engage the pistons 126 and limit displacement of the column 120 in the socket 153 so that column is retained in a fixed position relative to the base.

Once the column 120 is secured in the base 150, the rectangular shell is placed over the column and advanced toward the base until the end of the shell slides over the vertical tabs 156 that extend from the base. The opposite end of the column 120 may then be secured to another base if the column is being connected to a support structure at both ends. In such a case, the opposite end of the column 120 is secured to another base in the same manner described previously.

Once the ends of the column 120 are secured to bases, the post may be installed between support structures, such as a floor and ceiling, by sliding the post into position and mounting the bases to the support structures. The post may be mounted between a floor and ceiling without raising the ceiling or creating any temporary clearance space. As described earlier, the base is preferably mounted to the floor and ceiling with screws mounted through screw holes 157 located toward the outer perimeter of the base. In this arrangement, the screw holes 157 are accessible and unobstructed by the shell. Once the bases are mounted to the floor and ceiling, a trim frame may be assembled over exposed portions of the bases, as with the post structure previously described.

The post structures of the present invention provide a rigid column that supports overhead loads when mounted as a load bearing column between floors and ceilings. The latch mechanisms also withstand tensile forces applied on the post. As a result, the post structure is configured to reinforce porch roofs and other outdoor structures that are subject to wind uplift caused by tornados or other events with extreme winds.

Figure 14:
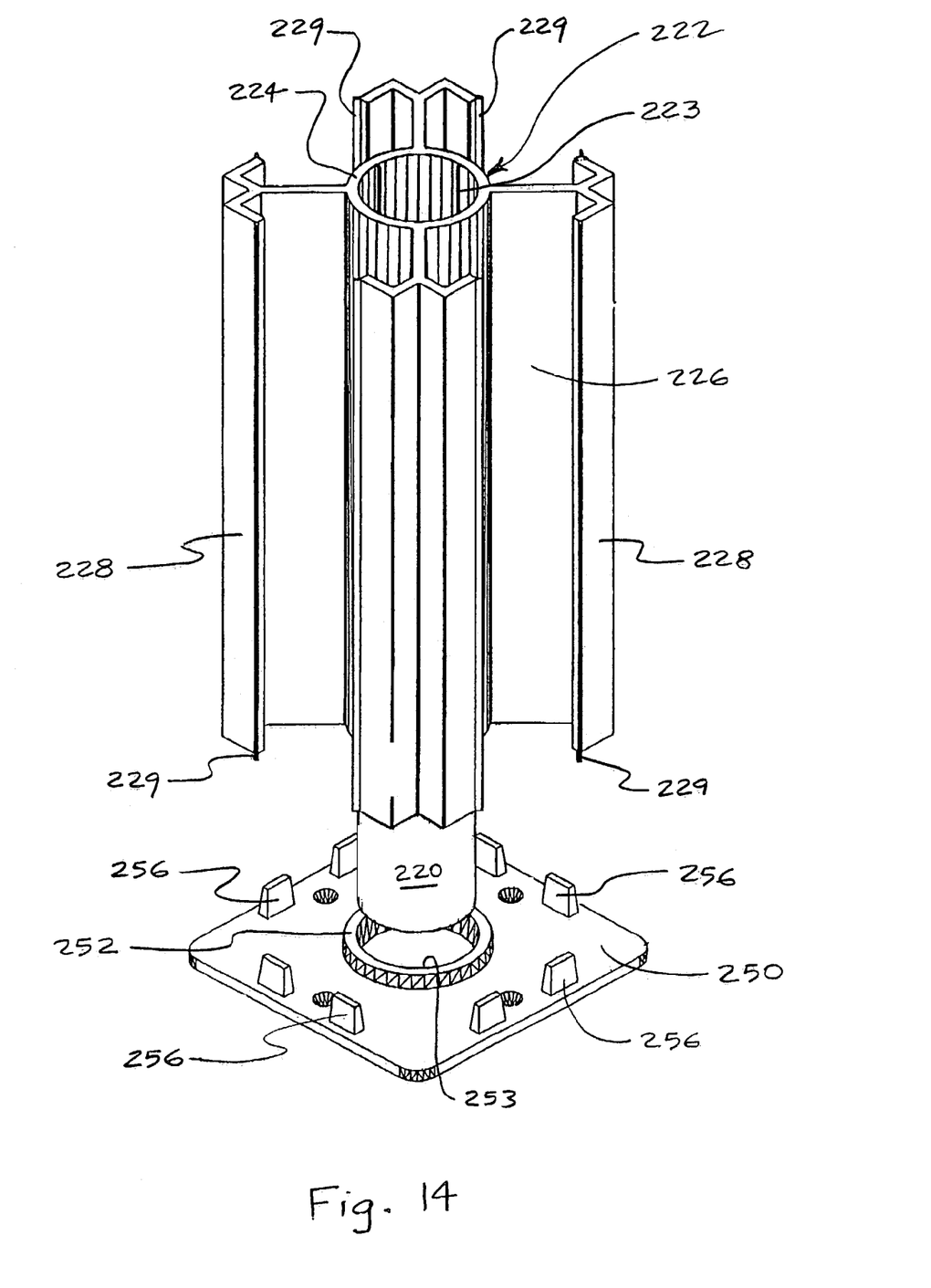
FIG. 14 is an exploded perspective view of a base, column and frame used in the post structure of FIG. 13.
Figure 15:
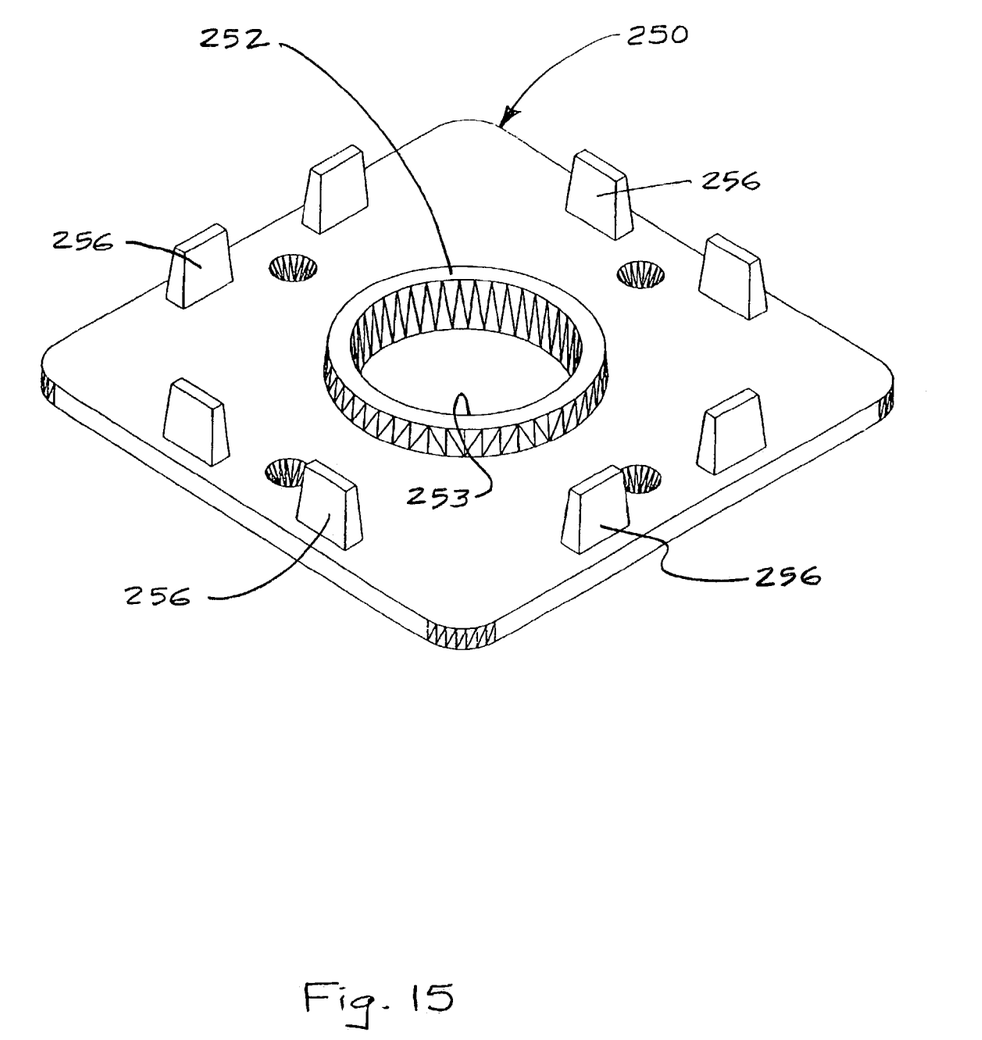
FIG. 15 is a perspective view of the base used in the post structure of FIG. 13.

Referring now to FIGS. 13–15, a third embodiment of a post assembly 210 is shown in accordance with the present invention. The post assembly 210 includes a column 220 formed of aluminum or other rigid material and a support frame 222 that surrounds the column. A shell 230 slides over the support frame 222 to enclose and conceal the frame and rigid column 220. The shell 230 may be manufactured with a variety of decorative styles, shapes and configurations applied to the ends of the shell and/or mid-section of the shell. For example, the shell 230 may be molded with a design resembling a Greek or Roman style column. In FIG. 13, the shell 230 is molded with generally rectangular ends that surround the support frame 222. The exterior of the column 220 contacts the interior of the frame 222 in frictional engagement. In addition, the exterior of the frame contacts the interior of the shell 230 in frictional engagement. As a result, the column 220, frame 222 and shell 230 may be assembled and secured together without fasteners. The column 220, frame 222 and shell 230 are mountable between two bases 250 and are held between the bases 250 by the load applied to the post structure.

The support frame 222 has a cylindrical hub 224 and a plurality of support fins 226 that extend radially outwardly from the hub. The support frame 222 is preferably extruded, but may also be formed from molded components. The cylindrical hub 224 forms a bore having a diameter slightly greater than or substantially equal to the outer diameter of the rigid column 220. The bore has an inner wall configured to frictionally engage the exterior of the rigid column 220. Preferably, the inner wall has a plurality of interior gaskets or ribs 223 extending longitudinally along the wall of the bore and projecting radially inwardly. The interior ribs 223 are formed of rubber or other material configured to frictionally engage the exterior of the column 220 when the frame 222 is positioned over the column. One more frames 222 may be inserted over the column 220 to support the shell 230. In longer post structures, for example, it may be desirable to insert the column through two or more frame sections.

The outward end of each support fin 226 has a pair of flanges 228 configured to engage the inner wall of the shell 230. The flanges 228 each include an exterior gasket or rib 229, similar to the interior ribs 223 on the inner wall of the cylindrical hub 224. The exterior ribs 229 may extend along the length of the flanges 228, or along sections of the flanges. When the shell 230 is placed over the support frame 222, the exterior ribs 229 frictionally engage the inner wall of the shell 230 to hold the shell in the frame. The flanges 228 abut the inner wall of the shell and provide a mounting surface behind the shell. In this arrangement, railings and mounting brackets may be mounted to the post structure with fasteners anchored into the flanges. Referring to FIG. 13, a mounting bracket 233 is mounted to the post structure with two screws that extend through the shell 230 into the flanges 228 on the support frame. The mounting bracket is configured to connect a horizontal railing member with the post structure.

The base 250 has a plurality of vertical tabs 256 that are configured to support the column. The tabs 256 each have an outer face that engages the inner walls of the shell when the shell, frame and column are connected with the base. Preferably, the outer faces of the tabs 256 align with the exterior of the flanges 228 on the support frame 222 so that the tabs and flanges provide a flush surface that uniformly engages the inner wall of the shell 230.

The base 250 has a circular collar 252 that forms a socket 253. The socket 253 is configured to support an end of the column 220. In contrast to the embodiments previously described, the collar 252 does not support or engage the column with a latch mechanism. The collar 252 may be configured so that the column slides into the inner diameter of the collar, or configured so that the column slides over the outer diameter of the collar. In FIG. 14, the inner diameter of the collar 252 is substantially equal to or slightly greater than the outer diameter of the rigid column 220. In this arrangement, the column 220 is configured to slide into the socket of the base 250. The base 250 may be mounted to a supporting structure using a variety of mounting arrangements. In FIGS. 13–15, the base 250 is shown with a plurality of screw holes that are adapted to receive screws. The screw holes are positioned inwardly from the tabs 256 and toward the center of the base 250. When the column 220, frame 222 and shell 230 are mounted over the base, the screws are concealed in the interior of the shell. The perimeter edge of the base preferably aligns with the perimeter of the rectangular shell 230 so that the exposed perimeter edge of the base is flush with the exterior of the shell. The perimeter edge of the base may also extend outwardly from the exterior of the shell, as in the post structures described above. A trim frame may be used to conceal the exposed portion of the base, as described earlier.

The post structure 210 may be constructed and installed as follows. A first base is mounted on the floor with the collar facing upwardly, and a second base is mounted on a ceiling with the collar facing downwardly and plum with the base and collar mounted on the floor. The rigid column 220 is then inserted into the cylindrical hub of one or more support frames, with the ends of the column projecting outwardly from the support frames in an exposed manner. The frame is then inserted into the shell to connect the column, frame and shell together. The ceiling is then raised with a jack or other lift mechanism to permit the column to be maneuvered and set between the opposing bases. The lower column end is inserted into the collar 253 on the base 250 mounted to the floor. If desired, the shell 230 may be moved upwardly on the frame so that the lower end of the column is visible as it is being set into the base on the floor. Once the lower end of the column 220 is inserted into the base mounted to the floor, the upper end of the column is aligned with the base mounted to the ceiling, and the ceiling is lowered onto the column so that the collar fits over the upper end of the column.

The terms and expressions which have been employed are used as terms of description and not of limitation. There is no intention in the use of such terms and expressions of excluding any equivalents of the features shown and described or portions thereof. It is recognized, therefore, that various modifications are possible within the scope and spirit of the invention. Accordingly, the invention incorporates variations that fall within the scope of the following claims.

I claim:

1. A frame apparatus comprising a plurality of interlocking identically configured pieces, each piece having a first extension and a second extension extending perpendicularly from the first extension, wherein each of said first and second extensions has an internal channel with one or more ratchet teeth in said channel, the ratchet teeth in the channels of the first extensions being adapted to lockingly engage the ratchet teeth in the channels of the second extensions of the adjoining pieces, the first extension of each piece adapted to receive the second extension of another piece in a telescoping connection, wherein said ratchet teeth in the first and second extensions are configured to slidably engage to allow the second extension to slide relative to the first extension into the channel, and further configured to lockingly engage to substantially prevent reverse sliding of the second extension relative to the first extension, such that the second extension is locked in engagement with the first extension.

2. A frame apparatus for concealing a joint between the end of an upright tubular shell and a transverse support joined to said shell, the shell having a rectangular outline with a width dimension and a length dimension, said frame comprising a plurality of interlocking identically configured pieces, said interlocked pieces forming a hollow rectangular frame adapted to surround the shell at its joints with the support, each piece having a first extension and a second extension joined to said first extension, said second extension extending perpendicularly from the first extension, the first extension of each piece having an internal channel closed at one end adjacent the junction with the second extension, and open at the distal end of said first extension remote from said junction, said channel adapted to receive the second extension of another piece in a telescoping connection, said second extension of each piece further comprising an internal channel and at least one breakable joint configured to be broken apart to change the length of the second extension to a desired length, wherein each of said first and second extensions have one or more ratchet teeth in their respective internal channels, the ratchet teeth in the channels of the first extensions being adapted to lockingly engage the ratchet teeth in the channels of the second extensions of the adjoining pieces.

3. The frame apparatus of claim 2 having series of breakable joints, comprising an indicia adjacent to each joint of said series of breakable joints, each of said indicia being indicative of a selected, finished dimension corresponding to a selected width dimension or a selected length dimension of the tubular shell adapted to be surrounded by said hollow rectangular frame.

4. A frame apparatus according to claim 2, wherein said interlocking pieces comprise:

A. a first trim piece having a long side and a short side, said short side of said first trim piece having ratchet teeth inside the channel; and B. a second trim piece having a long side and a short side, said long side of said second trim piece extending into the internal channel in the first trim piece in a telescoping relationship, said long side of said second trim piece comprising ratchet teeth slidably engaging the ratchet teeth in the short side of said first trim piece.

5. The frame apparatus of claim 4 wherein the short side of said second trim piece comprises an internal channel and a ratchet teeth inside the internal channel of the second trim piece.

6. The frame apparatus of claim 5, said interlocking pieces comprising a third trim piece having a long side and a short side, said long side of the third trim piece extending into the internal channel in said second trim piece in a telescoping relationship, said long side of the third trim piece comprising ratchet teeth slidably engaging the ratchet teeth in the short side of the second trim piece.

7. The frame apparatus of claim 6 wherein the short side of said third trim piece comprises an internal channel and ratchet teeth inside the internal channel of the third trim piece.

8. The frame apparatus of claim 7, said interlocking pieces comprising a fourth trim piece having a long side and a short side, said long side of the fourth trim piece extending into the internal channel in said third trim piece in a telescoping relationship, said long side of the fourth trim piece comprising a ratchet teeth slidably engaging the ratchet teeth in the short side of the third trim piece.

9. The frame apparatus of claim 8 wherein the short side of said fourth trim piece comprises an internal channel and ratchet teeth extending inside the internal channel of the fourth trim piece.

10. The frame apparatus of claim 9 wherein the long side of said first trim piece extends into the internal channel in said fourth trim piece in a telescoping relationship, said long side of said first trim piece comprising ratchet teeth slidably engaging the ratchet teeth in the short side of the fourth trim piece.

11. The frame apparatus of claim 2 comprising one or more scored sections on at least one of the extensions of each of said first and second trim pieces.

12. A frame apparatus comprising a plurality of interlocking identically configured pieces, each piece having a first extension and a second extension extending perpendicularly from the first extension, the first extension of each piece having an internal channel adapted to receive the second extension of another piece in a telescoping connection, said internal channel in the first extension having a plurality of ratchet teeth configured to mate with a plurality of ratchet teeth on the second extension, wherein said ratchet teeth in the first and second extensions are configured to slidably engage to allow the second extension to slide relative to the first extension into the channel, and further configured to lockingly engage to substantially prevent reverse sliding of the second extension relative to the first extension, such that the second extension is locked in engagement with the first extension, said frame pieces being interconnected to form a hollow rectangular frame, said frame apparatus in combination with:

a base member positioned within said hollow rectangular frame, and     a tubular shell extending transversely from said base member, said shell having an end forming an outer perimeter adjoining said base member, said frame pieces interlocking around said perimeter to conceal the end of said shell and said base member.

13. The combination of claim 12, said base member having an upstanding socket wall with an opening, said combination including     a column having an end configured for insertion into the socket and an aperture configured to align with the opening in the socket wall;

a latch disposed in the end of the column; and a biasing element configured to displace the latch through the aperture and into engagement with the column in the socket to secure the column in the socket.

14. The combination of claim 1, wherein the socket comprises a first opening and a second opening, and the column comprises a first aperture and a second aperture, said first and second openings in the socket being configured to align with the first and second apertures in the column when the end of the column is inserted into the socket.

15. The combination of claim 14, wherein the biasing element comprises an outwardly biased torsion spring in said column, said torsion spring having a first end and a second end, and the latch comprises a first pin extending from the first end of the torsion spring, and a second pin extending from the second end of the torsion spring, said first pin being configured to engage with the first opening and first aperture, and said second pin being configured to engage with the second opening and second aperture, said pins being urged into engagement with said openings and apertures under the bias of the torsion spring to secure the column in the socket.

16. The combination of claim 1, wherein the biasing element comprises an outwardly-biased compression spring having a first end and a second end, and wherein the latch comprises at least one piston circumferentially disposed around one of the ends of the compression spring, said piston being configured to engage with the opening in the socket and the aperture in the column, said piston being urged into engagement with said opening and said aperture under the outward bias of the compression spring to secure the column in the socket.

17. The combination of claim 16 further comprising a cylindrical housing disposed in the interior of the column, said housing forming a bore adapted to receive said piston and permit slidable displacement of said piston in said housing, wherein said housing is slidably adjustable within the interior of the column to permit alignment of the bore with the opening and aperture in the socket and column, respectively.

18. The combination of claim 17 further comprising a guide peg on the piston, said guide peg extending transversely from the longitudinal axis of the compression spring, said housing comprising a guide slot adapted to receive the guide peg on the piston, wherein the guide slot comprises a recess adapted to releasably retain the piston inwardly and out of engagement with the opening and aperture.

19. The combination of claim 18 wherein the guide slot comprises an inner recess, an outer recess and an intermediate recess disposed between said inner and outer recesses, said inner recess, intermediate recess, and outer recess being adapted to releasably retain the guide peg in a first position, second position, and third position, respectively, in which said piston is disengaged from the column aperture and socket opening in the first position, engaged with the column aperture and disengaged from the socket opening in the second position, and engaged with the column aperture and socket opening in the third position.

\* \* \* \* \*